Aug. 29, 1967 G. C. GAINER ETAL 3,339,013
ARC AND TRACKING RESISTANT INSULATION
Filed June 7, 1963
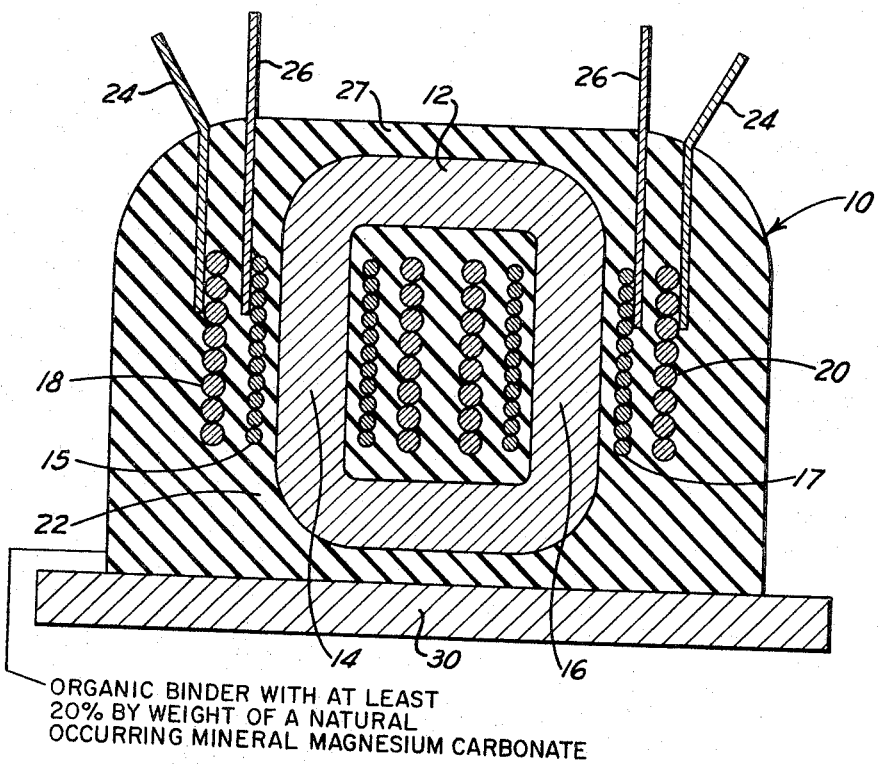
ORGANIC BINDER WITH AT LEAST
20% BY WEIGHT OF A NATURAL
OCCURRING MINERAL MAGNESIUM CARBONATE
INVENTORS.
GORDON C. GAINER
IRVING R. AXELRAD
BY
ATTORNEY

United States Patent Office 3,339,013
Patented Aug. 29, 1967

3,339,013
ARC AND TRACKING RESISTANT INSULATION
Gordon C. Gainer, Penn Hills Township, Allegheny County, and Irving R. Axelrad, Pittsburgh, Pa., assignors to Westinghouse Electric Corporation, East Pittsburgh, Pa., a corporation of Pennsylvania
Filed June 7, 1963, Ser. No. 286,415
16 Claims. (Cl. 174—137)

This invention relates to organic insulation used in conjunction with electrical equipment and in particular concerns the minimization of the adverse effects of arcing and the tracking and creepage resulting therefrom within or upon the surface of organic insulation associated with current conductors, under electric stress.

It is a known practice to incorporate certain inorganic compounds into organic materials that serve as electrical insulation. Among the purposes for which these additions are made are to impart resistance to arcing and the tracking resulting therefrom and to impart resistance to creepage tracking during exposure of the insulation to various conditions in use, for example high humidity, moisture or conducting surface contamination or any combination thereof under conditions of applied electric stress. For example, tracking may occur between conductors having different electric potentials when surface or other contamination lowers the insulation resistance of a material sufficiently to permit current leakage. When current flows through insulation, the insulation heats and the heating can become sufficiently intense to cause burning or charring. This can result in carbonization, which further contributes to conduction or current carrying ability of the insulation. In due course, a low resistance conducting path is completed, resulting in electrical failure. Also, surface or other contamination may sufficiently alter the electrical resistance such that arcing occurs due to high local electrical stress, which arcing leads to decomposition of the organic bearing insulating material, carbonization, and electrical failure in the manner outlined. While the addition of some materials to the organic insulating materials is known to aid in retarding these phenomena, the art is empirical, and there are no useful guides by which the utility of any given substance for these general purposes can be predicted.

It is a general object of this invention to provide a novel electrical insulation which is highly resistant to the deleterious effects of arcing and the tracking resulting therefrom.

It is a more specific object of this invention to provide electrical apparatus comprising a new combination of electrical insulation and one or more electrical conducting members which may be conveniently fabricated and will exhibit excellent resistance to arcing and tracking.

Another object of this invention is to provide novel compositions comprising an organic insulating material in combination with large amount of particulated natural occurring mineral magnesium carbonates or mixtures thereof which may be easily fabricated into desired shapes and may be exposed for prolonged periods to environment conducive to arcing and tracking.

Other objects of the invention will appear from time to time in the following detailed description and discussion of the invention.

In accordance with the present discoveries, these and other objects are achieved and insulation is provided that is particularly resistant to the effects of arcing and the tracking resulting therefrom. Such properties are developed through the incorporation in the organic insulating material of a mineral or natural occurring magnesium carbonate as is indicated in detail hereinafter. In this simple fashion, these desirable properties can be imparted to organic insulating materials without departing from the techniques presently utilized in producing and using these insulations. Moreover, these results are achieved at significant economies compared with practices heretofore used involving either the use of other materials for this purpose or the use of organic insulation free from modifying materials.

As noted above, the materials for incorporation into organic insulation to render it arc and tracking resistant are natural occuring minerals containing a substantial portion of magnesium carbonate. Typical of these minerals are magnesite or magnesium carbonate ($MgCO_3$), nesquehomite ($MgCO_3.3H_2O$), hydromagnesite $$[3MgCO_3.Mg(OH)_2.3H_2O]$$

and magnesium alba [$4MgCO_3.Mg(OH)_2.5H_2O$]. While it will be apparent to those skilled in the art that other naturally occuring minerals containing a similar quantity of magnesium carbonate can be utilized to advantage in this invention, the foregoing identified minerals, and magnesite in particular, constitute the preferred materials to be used. It should be understood that the term "natural occurring mineral magnesium carbonate" is to include all such minerals containing a substantial portion of magnesium carbonate.

The mineral magnesium carbonates are used in accordance with the discoveries of this invention in particulated or finely divided form, that is in a size that passes a 100 mesh (Tyler) screen and preferably all of a size of minus 325 mesh or smaller. Suitably, the particles used are relatively uniform in average size and can, if desired, be ground or milled for that purpose or for purposes of reducing the particle size. In any event, the mineral particles are incorporated in the organic insulation material in the usual fashion for the particular organic insulation involved; for example, the particles are milled into rubber or other elastomeric gum, or are blended into resinous materials that are sufficiently fluid to permit stirring so that uniform dispersions can be obtained.

One of the outstanding discoveries of this invention is that the use of these natural occurring inorganic minerals in insulation permits incorporation of amounts up to about 75 weight percent of the resulting insulation, with attendant increased arc and tracking resistance. We have found that such high loadings cannot be achieved with the manufactured or precipitated analogs of these materials, of which we are aware. In addition, since the mineral generally is far less expensive than the organic portion of the insulation, at least on a weight basis, it is evident that economic advantages are achieved with these high loadings. The actual quantity of magnesium carbonate used in any given instance will depend largely on the circumstances of use, that is whether mild or severe arc and tracking conditions are anticipated as well as considerations of formability and the like.

As noted hereinabove, organic insulating materials may be loaded with surprisingly large amounts of the natural occurring inorganic minerals. The oil or resin absorption of the particulated natural occurring minerals is lower than the oil or resin absorption of manufactured fillers of equivalent particle size. Apparently the particulated natural occurring minerals have a smaller surface area than manufactured fillers of equivalent particle size. These properties are manifested not only by the discovery that organic binding materials containing high loadings of the described materials may be satisfactorily molded, extruded or otherwise formed where the flow properties of the admixture are important but also by the discovery that for equivalent weight concentrations of similar sized particles, the naturally occurring minerals produce admixtures with better flowability than manufactured fillers.

In general, amounts of the mineral to result in about a 20 to 75 weight percent concentration are used with increased arc and track resistance accompanying the higher concentrations. The upper limit in any instance is the maximum amount of the mineral magnesium carbonate that can be included in the organic insulation while retaining suitable working properties so that the insulation can be applied to electrical equipment by means known to the art. A preferred range of concentration of the mineral for any insulation herein is on the order of 20 to about 70 weight percent.

The organic insulating materials of this invention are those presently being used in the electrical industry for laminating, potting, casting and molding practices with, for example, such equipment as circuit breakers, transformers, insulators and related devices. Generally, there are several classes of such organic insulations with which the present invention may be practiced. These include rubber, suitably synthetic rubber, polyester resins and epoxy resins, and such thermoplastics as the polyolefins (e.g. polyethylene and polypropylene), polymethylmethacrylate and the like. Among the rubbers that can be used are those such as ethylene-propylene, and the so-called tri- or terpolymers of ethylene and propylene, butyl rubbers, neoprene, Buna N, styrene-butadiene rubber and the like, with butyl being preferred.

The epoxy resins are another of the important classes of insulation material with which the invention may be practiced. One important type of commercial epoxy resin may be considered to be the mixture of condensation products of epichlorohydrin and a polyhydric phenol, usually diphenylol propane, known commercially as Bisphenol A. The product is called an epoxide or epoxy resin, because of the existence in the polymer of one or more epoxide groups (oxirane rings). Depending on the conditions employed, the condensation results in the formation of polyethers, and the product will contain aliphatic and aromatic hydroxyl groups by virtue of secondary reaction. These resins may therefore be essentially considered to be polyether derivatives of the polyhydric starting material and epichlorohydrin, containing epoxide and hydroxyl groups in varying amounts.

As pointed out, such resins generally have more than one epoxy group per molecule, for example, over one to about 10 epoxy groups per molecule. These resinous polymeric epoxides may, for example, be prepared by reacting from 1 to 10 mol proportions of an epihalohydrin, preferably epichlorohydrin, with about 1 mol proportion of Bisphenol A in the presence of a stoichiometric excess of alkali based on the amount of halogen. The mixture is heated to a temperature within the range of about 80° C. to 110° C. for a period of time varying from about one-half hour to three hours or more depending upon the quantities of reactants used. The resulting polymer may then be washed with hot water to remove unreacted alkali and halogen salts. Other suitable compounds are obtained by the peroxide oxidation of organic compounds containing a plurality of olefin groups, the olefin groups being converted to oxirane or epoxide groups. Other procedures for making these and other epoxy resins are well known in the patent literature, such as, for example, United States Patents 2,494,295; 2,500,600; 2,511,913 and 2,691,007; as well as in such standard texts as Epoxy Resins by Skeist, Reinhold Publishing Co. (1958) and Epoxy Resins by Lee et al., McGraw-Hill (1957), to which reference may be made.

The polyester resin compounds are formed by the reaction of a polyhydric alcohol and a polybasic acid, at least part of which is unsaturated. It is usual to employ maleic acid or anhydride, or fumaric acid as the source of unsaturation. This reaction product (a polyester) is usually copolymerized with a vinyl compound, after dissolving in a vinyl monomer, such as vinyl acetate, methyl methacrylate, styrene or the like, usually in the presence of a catalyst such as a peroxy catalyst, e.g. tertiary butyl hydroperoxide or benzoyl peroxide. Methods of preparing polyesters are well known and are found, for example, in the patent art and in such conventional texts as Polymers and Resins by Golding (1959), D. Van Nostrand Company.

The organic insulating materials containing mineral magnesium carbonate may be employed in the same manner as known electrical insulating materials. By way of example, they can be molded in conjunction with glass or asbestos fibers to produce shapes adapted to receive or enclose conductors or equipment containing spaced conductors such as transformers, or laminates can be prepared in conjunction with glass fiber mats, glass cloth, or various asbestos fibers, and structures assembled from these fiber reinforced, mineral filled laminates.

The single figure in the attached drawing is a sectional view of a transformer insulated according to this invention. The transformer 10 includes a core member 12 composed preferably of laminates of a suitable magnetic material, for example silicon steel. Spaced around the side legs 14 and 16 of the core member 12 are secondary windings 15 and 17 of the transformer. The secondary windings are insulatingly spaced from the legs of the core member. The primary windings 18 and 20 of the transformer are spaced around the secondary windings. Encasing the entire structure and filling the spaces between the secondary and primary coils, as well as between the secondary coils and the legs of the core member, is insulation 22 of a composition in accordance with the present discoveries as indicated above. This can be applied in any way desired. Leads 24 and 26 extend through the top 27 of the insulation 22 and constitute, respectively, the primary and secondary terminals for the transformer. If desired, the entire unit can be supported on a base member 30. Arcing may occur and tracking and creepage tracking can develop in such transformers in view of the presence of spaced conductors, within the body, that can be subjected to different potentials, or between conductors and terminals along the external surface, especially when in a contaminating atmosphere. It should be understood that the advantages attending this invention may be realized by employing the described natural minerals in organic insulation, whenever such insulation is exposed to an arcing environment or an environment conducive to tracking.

The invention will be described further in conjunction with the following specific examples in which the details are given by way of illustration and are not to be construed as limiting.

EXAMPLE I

Butyl rubber is used as the organic insulation in this example. This type of rubber is provided by suitably compounding and vulcanizing a selected butyl gum stock. Such gums are copolymers of isobutylene in major proportion, e.g., 60 to 99 percent, with a small proportion of a conjugated diolefin such as isoprene or butadiene. There is thus afforded a relatively high molecular weight polyolefin polymer containing pendant unsaturated groups, through which vulcanization can be made to occur by techniques familiar to the art. Such butyl gums are available commercially and in particular are marketed by the Enjay Co. The butyl gum used in this example is a copolymer of about 99 units of isobutylene and 1 unit of isoprene.

The butyl gum (Enjay Co. #035) is placed on a cold 2-roll mill and worked until it bends completely around the rolls. Then the mineral magnesium carbonate (minus 325 mesh) in accordance with this invention is added to the milling gum in small increments and milling continued until dispersion of the added filler is obtained. The filled gum is then worked on a hot mill at 150° C. for 10 minutes. Thereafter, it is again placed on the cold mill and conventional butyl rubber accelerators, vulcanizing agents, softeners, and the like, in amounts as set forth in the table below, are incorporated. One-fourth inch samples are molded from this stock by pressing at 1200 p.s.i. in a 4 inch diameter compression mold held at a temperature in the range of 150° to 160° C.

The quantities of each ingredient used in this formulation are:

Table 1

| Material: | Parts by weight |
| --- | --- |
| Butyl gum | 100 |
| Magnesium oxide | 5 |
| Zinc oxide | 5 |
| Carbon black | 3 |
| Elastopar (Monsanto) | 1.5 |
| Kenflex N (Kenrich Corp., Maspeth, N.Y.) | 10.0 |
| Anti-Chek Wax (Sun Oil) | 5.0 |
| Zinc stearate | 5.0 |
| Paraffin Oil 511 (Sun Oil) | 4.0 |
| Dibenzo-p-quinone dioxine | 6.0 |
| p-Quinone dioxine | 2.0 |
| Triplumbic oxide ($Pb_3O_4$) | 10.0 |
| Sulfur | 1.5 |
| Natural mineral Australian magnesite ($MgCO_3$) | [1] 368.0 |

[1] The magnesite is 70 weight percent of the formulation.

Elastopar is a commercial form of N-methyl-N,4-dinitroso-aniline, absorbed to a weight content of 33.3 percent on a clay. Kenflex N is a polymeric aromatic hydrocarbon resin having a specific gravity of 1.01, a flash point of 375° F., a drop point of 35° F. and a boiling point of 350° F. at 2 mm., and is a flexibilizer for butyl rubber. The wax is a highly refined petroleum wax (paraffinic) having a melting point of 153–156° F., a viscosity in SUS at 210° F. of 44.8, a specific gravity at 60° F. of 0.928 and of 0.767 at 212° F. The paraffin oil has a viscosity of 100–120 SUS at 100° F., a viscosity index of 90 and an A.P.I. gravity of 31–33.

One inch squares of the samples obtained from the pressing operation are then tested for wet arc and track resistance. In the test, suitable specimens are subjected to a metal-to-liquid electric discharge applied continuously for one minute. The liquid is one weight percent ammonium chloride in water containing 0.1 percent of a wetting agent (Aerosol OT). Immediately after discharge, the surface is tested successively at 500 volts and 1000 volts for breakdown. The test procedure as well as details of the equipment used is described by Mandelcorn and Dakin in an article entitled "Wet Surface Tracking of Insulation: A Differential Test With Controlled Short Discharges to a Water Electrode," AIEE Transactions, pt. III (Power Apparatus and Systems), vol. 81, 1962, p. 291. The power levels used in the discharge arc are: 8.1 watts, 5.5 watts and 2.9 watts, all at 3000 volts.

In the test, a material must withstand the arc discharge for one full minute at the selected power level and must not reveal a conducting path when immediately tested at 500 volt and 1000 volt levels. Data in this test have been correlated by Mandelcorn and Dakin with those of the conventional Dust and Fog test (ASTM Method D-2132-62T) as follows: 2.9 watt pass corresponds to 40 to 60 hours life in the Dust and Fog test, a 5.5 watt pass corresponds to 60 to 300 hours life, and an 8.1 watt pass corresponds to greater than 500 hours.

Various samples of butyl rubber filled with natural magnesium carbonate were made using the procedure outlined above. In one, natural magnesite ($MgCO_3$) in an amount of 70 weight percent of the resulting insulation was used. The mineral carbonate, all minus 325 mesh, was used as received. Samples were subjected to the differential wet track resistance test, cited above, and all passed the tests at all power levels.

In other runs, the natural magnesite was ball milled and then incorporated in the butyl rubber to the 70 percent level indicated above. Samples of this rubber were subjected to the same test at 8.1 watts, three runs being conducted, and passed in each instance.

Ball milled samples of the natural magnesite used in a quantity of about 60 to 65 percent in the butyl rubber, resulted in consistent passes at the 5.5 watt level, but there were occasional failures at the 8.1 watt level. As is evident, this insulation is effective but would be used under less stringent circumstances than those above.

Power factor and cumulative weight loss tests also were conducted on the above materials. In all instances it was found that the improved arc and track resistance was obtained without sacrifice in these other important characteristics.

Then a natural hydromagnesite, $$3MgCO_3 \cdot Mg(OH)_2 \cdot 3H_2O$$

was incorporated in the butyl gum to 70 weight percent. The mineral had been Wiley milled until it passed a 400 mesh screen (Tyler). Samples molded from the compounded butyl rubber composition were then subjected to the differential wet track resistance test at a power level of 8.1 watts and passed in all instances. Obviously, passes would also be had at lower power levels.

It is known in the art to incorporate hydrated aluminum oxide ($Al_2O_3 \cdot 3H_2O$) in rubber, epoxy resin, and polyester resin insulation to impart arc and tracking resistance. If desired for any reason, such as molding convenience, viscosity considerations and the like, a portion of the magnesite content of compositions in accordance with this invention can be replaced by small percentages of aluminum trihydrate, i.e. up to about 20 weight percent of the total insulation. By way of example, compositions have been made with (1) 20 percent aluminum trihydrate and 50 percent magnesite and 30 percent rubber, (2) 15 percent aluminum trihydrate, 45 percent magnesite and 40 percent rubber and (3) 15 percent aluminum trihydrate, 50 percent magnesite and 35 percent rubber, and tested for arc and tracking resistance. Satisfactory results were had in all instances and it was further noted that moldability was satisfactory as measured by presently used commercial practices.

The other elastomeric as well as thermoplastic organic insulation materials set forth hereinbefore can be used in place of the butyl rubber in the above examples in the same general manner to produce magnesite-containing insulation with arc and tracking resistance.

EXAMPLE II

Polyester base insulating materials were tested as follows: A resin formulation was made, by weight, with 45 parts of an unsaturated polyester resin, containing monomeric methyl methacrylate (75 percent polyester), having an acid number below 38 and a Gardner-Holdt viscosity at 25° C. of Z+–Z1+ (Paraplex P444, Rohm & Haas Co.), 45 parts of a self-extinguishing polyester resin having a Gardner-Holdt viscosity of Z–Z1 and a specific gravity of 1.26 (Laminac 4146, American Cyanamid), 4.5 parts alpha-methyl styrene, 5 parts styrene and 0.5 part benzoyl peroxide. Natural Australian magnesite of minus 325 mesh particle size was used. The magnesite was incorporated in the resin composition in amounts to yield concentrations, by weight, of 55 percent, 60 percent, 65 percent and 70 percent of magnesite based on the resulting insulation. Test specimens were made by casting or molding the deaerated, filled resin into plates ¼ inch thick, and curing with heat using techniques well known to the art. All samples passed all differential wet tracking tests at the 5.5 watt arc power level, with the 70 weight percent concentration also passing all tests at the 8.1 power level.

In other tests, resins comprising 30 percent styrene and the remainder Paraplex P444 (see above) were made and filled with the Australian magnesite to the same levels, that is 55, 60, 65 and 70 percent concentrations by weight. Test samples were prepared and tested as before. All samples passed the tracking tests at the 5.5 level and the 65 and 70 weight percent concentrations also passed the 8.1 watt level tests. Other samples were prepared where the only change from the foregoing was that only 20 percent of styrene was used. Here again, all samples passed at the 5.5 watt level while complete success at the 8.1 watt level was had with the 70 weight percent material.

It is to be noted that these same resins, without the natural magnesite added in accordance with this invention, failed to pass even the 1.3 watt arc power level test. This is considered to demonstrate dramatically the surprising beneficial effect of natural occurring mineral magnesium carbonate in resisting the adverse effects of arcing in accordance with this invention.

In further tests, when conventional glass fiber mat was incorporated into a polyester resin containing, for example, 65 weight percent of natural magnesite, and laminated under heat and pressure, an arc and tracking resistant glass reinforced laminate or molding was produced.

For example, a polyester laminating resin was formulated by mixing 45 parts of Paraplex P444, 45 parts of Laminac 4146, 4.5 parts alpha-methylstyrene, 5 parts styrene and 0.5 part benzoyl peroxide (as catalyst). All parts are by weight. To 35 parts, by weight, of this resin, was added 65 parts of natural Australian magnesite, and the mixture was thoroughly dispersed by use of a three roll paint mill. Three plys of #219, 1½ oz. glass fiber mat, cut to mold size, were trowelled with the resin-filler mixture. The "wet" layup was stacked in a mold, preheated to 125° C., and pressed at 200 p.s.i. for ten minutes, at 125° C.

Upon removal of the sample from the mold, a glass-fiber reinforced laminate, approximately ⅛ inch thick was obtained, which, when tested for arc and tracking resistance, as above outlined, passed the 5.5 watt power level test.

Similar results were obtained when natural hydromagnesite (65 parts) was substituted for the Australian magnesite in the above example.

EXAMPLE III

Other tests were performed employing epoxy resin to which natural magnesite was added. For example, 43.3 parts of a diglycidyl ether of bisphenol "A" having a viscosity at 77° F. of 10,000 to 16,000 cps., and an epoxide equivalent weight of 185 to 200 (Epi-Rez 510, Jones-Dabney Co.), and 23.3 parts of a low viscosity fluid epoxy resin of a straight chain diglycidyl ether having an epoxy equivalent weight of 330 and a viscosity at 25° F. of 57 centistokes (Dow Chemical, Epoxy X–2673.2, now DER 732) were admixed with 33.3 parts of an amido-amino curing agent having a viscosity at 77° F. of 150 to 400 cps. and an approximate equivalent weight of 90 (Epicure 855, Jones-Dabney). The latter was employed as the hardener for the aforementioned epoxy resin mixture. To 30 parts of the resinous mixture were added 70 parts of natural Australian magnesite. The resin-magnesite mixture was thoroughly dispersed and poured into a mold and cured at 100° C. for two hours. Thereby ¼ inch thick test plates were prepared and were then tested for arc and tracking resistance. Satisfactory passes were obtained at the 5.5 watt power level.

In conjunction with suitable hardeners, other resins and monomers, which contain the epoxy group, may be used as the organic binder for the mineral magnesium carbonate of this invention. Examples of such are the Oxirons (Food Machinery and Chemical Corp.), the epoxidized triglycerides, such as the Epoxols (Swift and Co.), the Araldites (Ciba Co.), and the Epons (Shell Chemical Co.).

As with the rubber base materials, aluminum trihydrate in small amounts up to about 20 weight percent may be substituted for part of the mineral magnesium carbonates in the polyester and epoxy base insulations, and the arc and tracking resistance, characteristic of this invention, are retained. Similarly, glass and asbestos fibers in various forms may be included to impart particular properties if desired.

From the foregoing discussion and description, it is evident that our invention provides a highly effective solution to the problem of alleviating insulation destruction arising from arcing and in minimizing tracking in electrical apparatus subject to atmospheric contamination and the effects of spaced conductors that are subjected to different electrical potentials.

Unless otherwise indicated, all parts and percentages given are by weight.

While the invention has been disclosed with reference to particular embodiments, it will be understood that modifications, changes and substitutions may be made without departing from its scope.

We claim:

1. In electrical apparatus including spaced electrically conductive members between which an electrical potential may be developed and between which an organic insulating material is disposed, the improvement comprising dispersing in the organic insulation about 20 to 75 weight percent, based on the resulting insulation, of a natural occurring mineral magnesium carbonate to impart improved arc and tracking resistance thereto.

2. In electrical apparatus including spaced electrically conductive members between which an electrical potential may be developed and between which an organic insulating material is disposed, the improvement comprising forming the organic insulating material from a material selected from the group consisting of rubber, epoxy resins and polyester resins, and dispersing therein about 20 to 75 weight percent, based on the resulting insulation, of a natural occurring mineral magnesium carbonate.

3. Apparatus in accordance with claim 2 in which said natural occurring mineral magnesium carbonate is selected from the group consisting of magnesite, hydrated magnesium carbonates and hydrated basic magnesium carbonates.

4. In combination with electrical apparatus comprising electrically conductive members, an organic insulating material of improved arc and tracking resistance disposed about the conductive members comprising at least one member selected from the group consisting of magnesite, hydrated magnesium carbonates and hydrated basic magnesium carbonates, said carbonates being of natural occurring mineral origin, dispersed in the material and comprising 20 to 75 weight percent of the insulation, and said insulating material being selected from the group consisting of rubber, polyester resins and epoxy resins.

5. In electrical apparatus including spaced electrically conductive members between which an electric potential may be developed, a molded insulating element supporting and largely surrounding the electrically conducting members and having a surface to be exposed to atmosphere in which the apparatus is used, the molded insulating element being formed from an admixture of a natural occurring mineral magnesium carbonate and an organic insulating material selected from the group consisting of epoxy resins, rubber and polyester resins, the carbonate being present in an amount of about 20 to 75 percent by weight based on the total weight of said molded insulating element.

6. Apparatus in accordance with claim 5, said organic material being epoxy resin.

7. Apparatus in accordance with claim 5, said organic material being polyester resin.

8. Apparatus in accordance with claim 5, said organic material being a rubber.

9. In electrical apparatus having organic insulating material exposed to arcing and tracking, the improvement comprising dispersing in the organic material from about 20 to 75 weight percent, based on the resulting insulation, of a particulated natural occurring mineral magnesium carbonate.

10. An electrical insulating composition comprising an organic electrical insulating binder having dispersed therethrough about 20 to 75 weight percent, based on the weight of the composition, of a particulated natural occuring mineral magnesium carbonate.

11. An electrical insulating composition comprising an organic binder selected from the group consisting of rubber, polyester and epoxy resins and, dispersed in said binder, about 20 to 75 weight percent, based on the weight of the composition, of a particulated natural occurring mineral magnesium carbonate.

12. The composition of claim 11 in which said natural occurring mineral magnesium carbonate is selected from the group consisting of magnesite, hydrated magnesium carbonates, hydrated basic magnesium carbonates and mixtures thereof.

13. The composition of claim 11 in which said natural occurring mineral magnesium carbonate is magnesite.

14. The composition of claim 11 in which said natural occurring mineral magnesium carbonate is hydromagnesite.

15. The composition of claim 11 in which said natural occurring mineral magnesium carbonate is a hydrated magnesium carbonate.

16. The composition of claim 11 in which said natural occurring mineral magnesium carbonate is a hydrated basic magnesium carbonate.

References Cited

UNITED STATES PATENTS

| | | | |
|---|---|---|---|
| 2,325,416 | 7/1943 | McMahon | 200—120 |
| 2,768,264 | 10/1956 | Jones et al. | |
| 2,997,526 | 8/1961 | Kessel et al. | 174—137 |
| 2,997,527 | 8/1961 | Kessel et al. | 174—137 |
| 2,997,528 | 8/1961 | Kessel et al. | 174—137 |

FOREIGN PATENTS

| | | |
|---|---|---|
| 1,267,518 | 6/1961 | France. |

LARAMIE E. ASKIN, *Primary Examiner.*